United States Patent [19]

Young

[11] 4,045,663
[45] Aug. 30, 1977

[54] RECHARGEABLE FLASHLIGHT ASSEMBLY

[75] Inventor: Danny J. Young, Tyler, Tex.

[73] Assignee: James W. Fair, Tyler, Tex.

[21] Appl. No.: 696,820

[22] Filed: June 16, 1976

[51] Int. Cl.² ............................ F21L 7/00; H04B 1/08
[52] U.S. Cl. .............................. 240/10.6 CH; 325/361
[58] Field of Search ............. 240/2 R, 10.6 CH, 37.1, 240/2 L; 325/361

[56] References Cited

U.S. PATENT DOCUMENTS

| 1,752,196 | 3/1930 | Patrie | 240/2 L UX |
|---|---|---|---|
| 2,396,121 | 3/1946 | Patino | 325/361 |
| 3,179,891 | 4/1965 | Sharma | 325/361 |
| 3,591,796 | 7/1971 | Barker | 240/37.1 |
| 3,749,905 | 7/1973 | Friedman | 240/10.6 CH |
| 3,787,678 | 1/1974 | Rainer | 240/10.6 CH |
| 3,825,740 | 7/1974 | Friedman | 240/10.6 CH |
| 3,829,676 | 8/1974 | Nelson et al. | 240/10.6 CH |
| 3,976,986 | 8/1976 | Zabroski | 240/10.6 CH X |

*Primary Examiner*—Donald A. Griffin
*Attorney, Agent, or Firm*—Cushman, Darby & Cushman

[57] ABSTRACT

A flashlight assembly including a flashlight bulb and an accessory device, such as a two-way wireless radio, operated by the same rechargeable battery. Recharging circuitry provides for sure, ready recharging of the battery, and low-current drain flashing circuitry provides for long flashing life for a given battery charge. All of the components are mounted in a casing, the casing having a handle affixed thereto for facilitating ready manipulation and utilization of the flashlight bulb and accessory device.

14 Claims, 4 Drawing Figures

RECHARGEABLE FLASHLIGHT ASSEMBLY

BACKGROUND AND SUMMARY OF THE INVENTION

The invention relates to a single-casing flashlight assembly that has multiple functions, all functioning devices being powered by a single rechargeable battery, sure, ready means being provided for recharging the battery, and low-current drain means being provided for flashing the flashlight bulb. While there have been previous proposals for flashlight assemblies with rechargeable batteries (such as shown in U.S. Pat. Nos. 3,591,796, 3,749,905, 3,787,678, 3,825,740, and 3,829,676), none have provided the multiple uses according to the present invention, nor the low-current drain flashing means according to the present invention.

According to the present invention a flashlight assembly is provided including a flashlight bulb, rechargeable battery, circuitry for recharging the battery, and low-current drain circuitry means for flashing the bulb, all operatively mounted on and contained in a casing. An accessory device powered by the battery is also contained in the casing, such as a two-way wireless radio (especially useful in the combination according to the present invention for search and rescue teams and hunters), an a.m. and/or f.m. radio, a cigarette lighter, or a second emitting means for emitting audio signals at frequencies which repel mosquitoes (especially useful for campers). A handle is affixed to the casing for facilitating ready manipulation and utilization of the flashlight bulb and the accessory device. The recharging circuitry includes a charger input, a current limiting resistor, and a light emitting diode for providing a positive indication of when the battery is being recharged. The low-current drain circuitry means includes an internal light source, a photocell for receiving light from the source, and a first switch movable between "flashing", "on", and "off" positions for selectively connecting the internal light source to the battery to thereby provide flashing of the bulb, or to disconnect the internal light source from the battery whereby no flashing of the bulb occurs. The photocell is connected to a relay coil and capacitor (which are in parallel), the relay coil controlling a movable contact which is normally biased into engagement with a first stationary contact to move it into contact with a second stationary contact, whereby flashing occurs.

It is the primary object according to the present invention to provide a multiple-use flashlight assembly including sure, ready recharging circuitry and low-current drain flashing circuitry. This and other objects of the invention will become clear from an inspection of the detailed description of the invention, and from the appended claims.

DETAILED DESCRIPTION OF THE INVENTION

Figure 1:
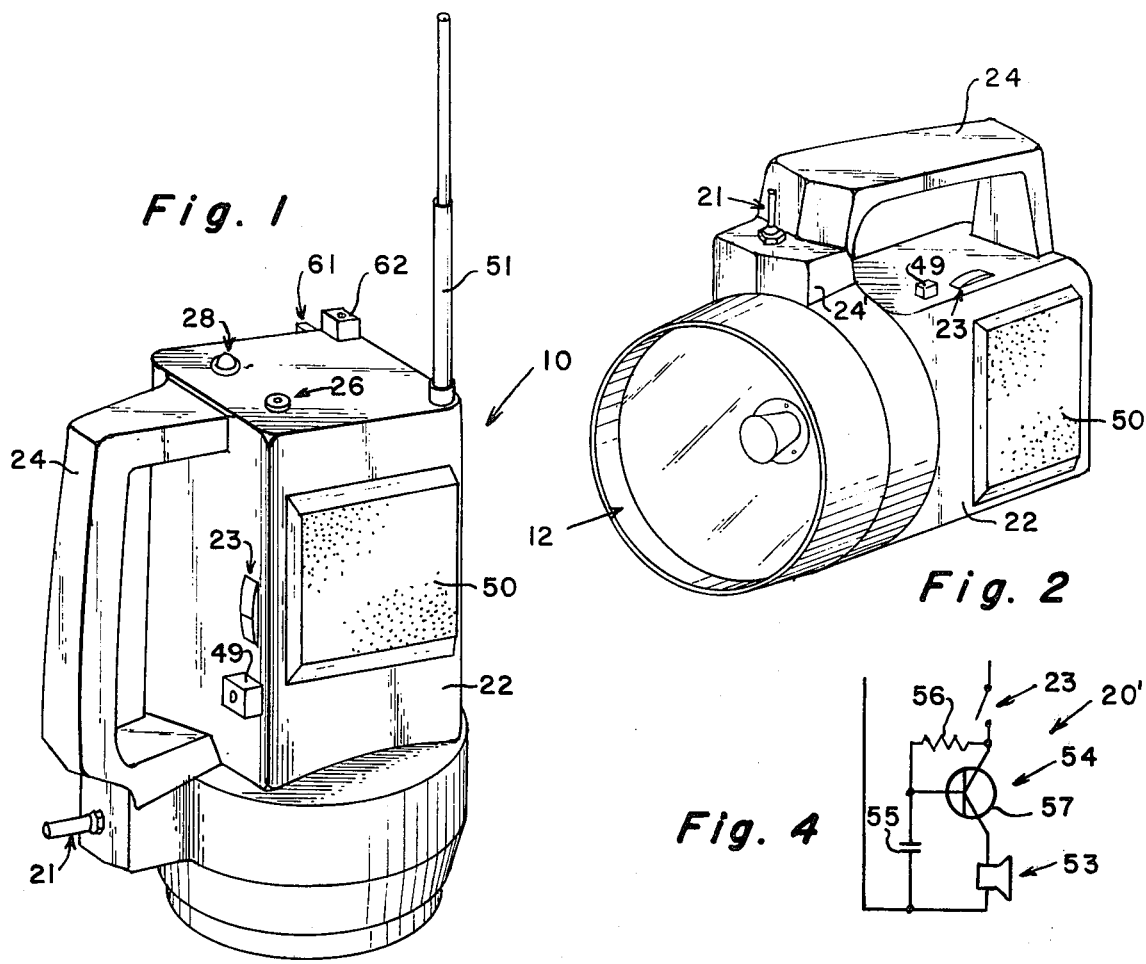
FIG. 1 is a perspective view of an exemplary flashlight assembly according to the present invention shown in an orientation in which a two-way radio associated therewith may be easily utilized.
Figure 2:
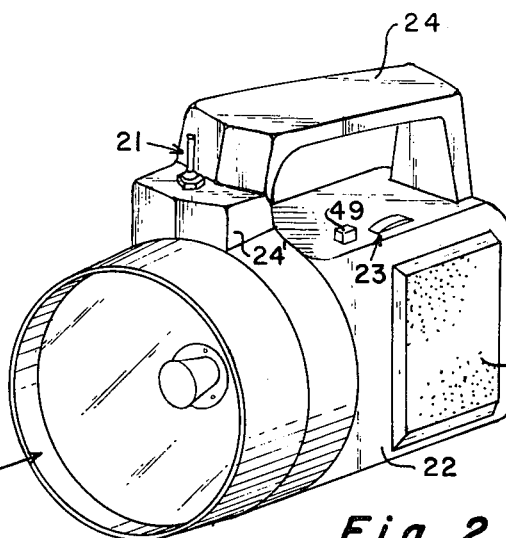
FIG. 2 is a perspective view of the assembly of FIG. 1 showing it in an orientation for ready utilization of the flashlight bulb thereof.

A flashlight assembly according to the present invention is shown generally at 10 in FIG. 1. The other referenced components of the invention in the drawings are as follows:

| | | | |
|---|---|---|---|
| 12 | A flashlight bulb | 14 | A rechargeable battery |
| 16 | Recharging circuitry | 18 | Flashing circuitry |
| 20 | A general accessory battery powered device 20' A modified accessory device | 21 | A first switch |
| 22 | A casing | 23 | A second switch |
| 24 | A handle | 24' | A handle portion |
| 26 | A charger input | 27 | A current-limiting resistor |
| 28 | A light-emitting diode | 30 | A terminal jack |
| 32 | Power supplying means | 34 | An internal light source |
| 36 | A photocell | 37 | A light-tight casing |
| 38 | A "flashing" contact | 39 | An "off" contact |
| 40 | An "on" contact | 42 | A first capacitor |
| 44 | A relay coil | 45 | A moveable relay contact |
| 46 | A first stationary contact | 47 | A second stationary contact |
| 49 | A push-to-talk switch | 50 | A speaker microphone |
| 51 | An antenna | 53 | A sound emitting means |
| 54 | Amplifier circuitry | 55 | A second capacitor |
| 56 | A resistor | 57 | A gate amplifier |
| 60 | A second accessory device | 61 | A third switch |
| 62 | A cigarette lighter | | |

Figure 4:
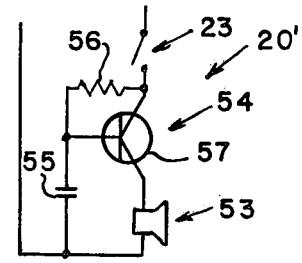
FIG. 4 is a circuitry section that may be provided in lieu of a portion of the circuitry shown in FIG. 3.

The flashlight bulb 12 is mounted in the front of the casing 22, the handle 24 is mounted on top of the casing 22, the first and second switches 21, 23 are mounted on opposite sides of the handle portion 24' on top of the casing, and the light-emitting diode 28 and the charger input 26 are mounted on back of the casing. When the accessory device 20 is a wireless transmitting and receiving device, a speaker-microphone 50 therefor is mounted on one side face of the casing 22 and the device is readily utilizable in the positions shown in FIG. 1. The accessory device 20 may also include a sound emitter assembly 20' (see FIG. 4) including an amplified sound emitting means 43 for emitting audio signals at frequencies which repel mospuitoes (the means 53 mounted in place of speaker-microphone 50). The device 20 may also comprise an a.m. and/or f.m. radio, in which case the speaker therefor may also be provided on a side of the casing 22. While the accessory device 20 may also comprise a battery-operated cigarette lighter 62, preferably the second accessory device 60 comprises the cigarette lighter 62. The lighter 62 may be mounted on the rear of the casing 22, with the third switch 61 for control thereof mounted adjacent thereto. Whatever type of accessory device 20 is utilized, the assembly 10 functions as a convenient multi-purpose unit, especially useful for hunters, search and rescue teams, campers, and the like. The handle 24 is affixed to the casing 22, and the bulb 12 and accessory device 20 (and controls therefor) are mounted so as to facilitate ready manipulation and utilization of the bulb 12 and the accessory device 20.

The light-emitting diode 28 indicates when the battery 14 (which preferably is a Gel Cell type) is recharging to insure that a proper connection is made between terminal jack 30 and charger input 26. The power source 32 for the terminal jack 30 may take a variety of forms. For instance, it could be a conventional automobile cigarette lighter adapter for plugging in to the cigarette lighter of a vehicle, or it could be a conventional solar cell, or it could be conventional A.C. adapter with a plug for connection to a wall socket.

Figure 3:
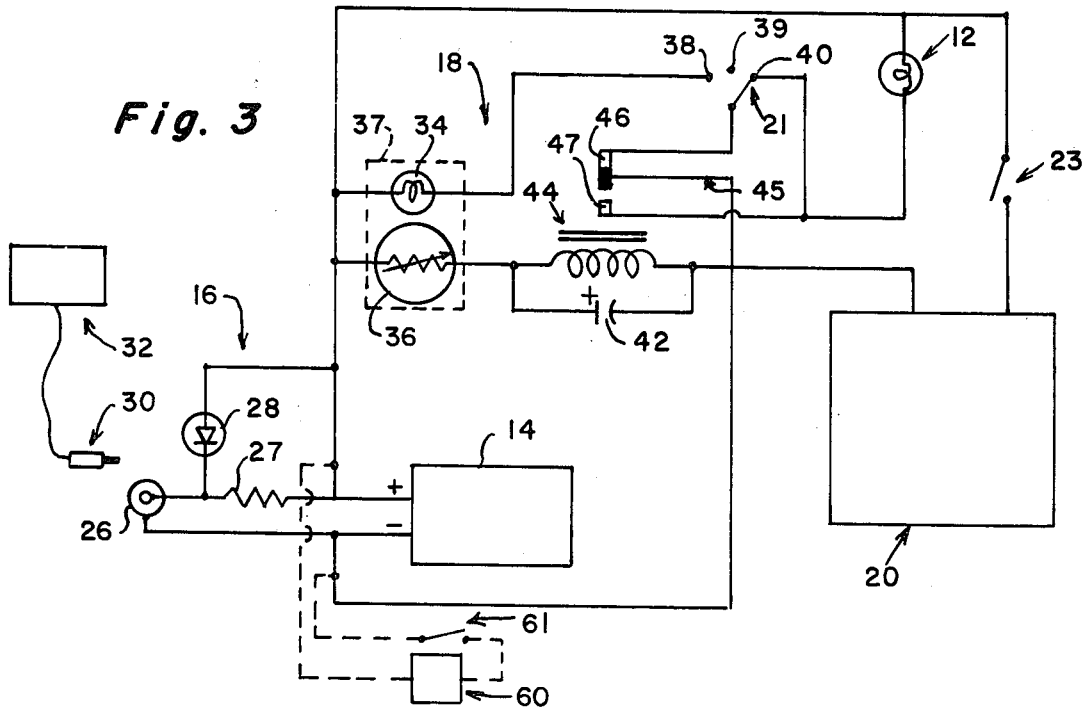
FIG. 3 is a schematic circuitry diagram of an exemplary flashlight assembly according to the present invention.

The flashing circuitry 18 is provided since a flashing light is more readily detectable in an emergency situation, and the particular flashing circuitry 18 illustrated in FIG. 3 is especially adaptable to the assembly of the present invention since it has low-current drain when the flasher is being used compared to other systems, and therefore it will flash for a longer period of time. With the first switch 21 in the "flashing" position 38, current from battery 14 illuminates internal light source 34, the light from source 34 is sensed by photocell 36 and its resistance decreases until the coil 44 is energized causing the movable contact 45 (which is normally biased into engagement with the first stationary contact 46 by its inherent resiliency) to move out of engagement with first contact 46, and into engagement with second stationary contact 47. When this occurs, current no longer flows through source 34, whereby the coil 44 is de-energized and the movable contact 45 returns under the influence of its inherent bias into engagement with first stationary contact 46. The cycle is then repeated. The coil resistance of relay 44, and the value of first capacitor 42 determine the rate at which bulb 12 will flash. When the first switch 21 is in the "off" position 39, the bulb 12 is not energized (although the accessory device 20 and the second accessory device 60 may be utilized), and when the first switch 21 is in the "on" position 40, the current passes directly through moveable contact 45 and first stationary contact 46 and continuously energizes the bulb 12.

It will thus be seen that according to the present invention a flashlight assembly has been provided that includes a number of conveniently utilized functioning devices, all of the functioning devices operated from the same rechargable battery, provides for sure, ready recharging of the battery, and provides for low-current drain flashing of the flashlight bulb.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

WHAT IS CLAIMED IS:

1. A flashlight assembly comprising
 a. a flashlight bulb,
 b. a rechargeable battery for energizing said bulb,
 c. circuitry for providing recharging of said battery, including a charger input, a current limiting resistor, and a light emitting diode for indicating when recharging is taking place,
 d. circuitry means for selectively flashing said flashlight bulb or permitting continuous operation thereof, said circuitry means including an internal light source, a photocell for receiving light from said internal light source, and a first switch for selectively operatively connecting said internal light source to said battery to thereby provide flashing of said flashlight bulb, or to disconnect said internal light source from said battery whereby no flashing of said flashlight bulb occurs,
 e. an accessory device powered by said battery,
 f. a second switch for selectively operatively connecting said accessory device to said battery,
 g. a casing operatively mounting and containing elements (a)-(f) above, and
 h. a handle affixed to said casing for facilitating ready manipulation and utilization of said flashlight bulb and said accessory device.

2. A flashlight assembly as recited in claim 1 wherein said circuitry means further comprises a coil and a capacitor disposed in parallel with each other and in series with said photocell, a moveable contact moveable in response to energization of said coil, first and second stationary contacts positioned adjacent said moveable contact, said first stationary contact being operatively connected through said first switch to either said internal light source or said flashlight bulb, and said second stationary contact being operatively connected to said flashlight bulb, and means for normally biasing said moveable contact into engagement with said first contact.

3. A flashlight assembly as recited in claim 2 further comprising a second accessory device powered by said battery, and a third switch for selectively operatively connecting said second accessory device to said battery.

4. A flashlight assembly as recited in claim 3 wherein said second accessory device comprises a battery-operated cigarette lighter.

5. A flashlight assembly as recited in claim 1 wherein said accessory device comprises a wireless transmitting and receiving device including a push-to-talk switch, and wherein said flashlight bulb is mounted on the front of said casing, said handle is mounted on the top of said casing, and speaker-microphone for said wireless transmitting and receiving device is mounted on a side of said casing.

6. A flashlight assembly as recited in claim 1 wherein said accessory device comprises a sound emitting means for emitting audio signals at frequencies which repel mosquitoes.

7. A flashlight assembly as recited in claim 6 further comprising an amplifier circuit, including a gate amplifier, operatively connected to said sound emitting means.

8. A flashlight assembly as recited in claim 1 further comprising a terminal jack for connection to an input of said recharging circuitry, and an automobile cigarette lighter adapted operatively connected to said terminal jack.

9. A flashlight assembly as recited in claim 1 further comprising a terminal jack for connection to an input of said recharging circuitry, and solar cell operatively connected to said terminal jack.

10. A flashlight assembly as recited in claim 1 further comprising a terminal jack for connection to an input of said recharging circuitry, and an A.C. adapter and a plug operatively connected to said terminal jack.

11. A flashlight assembly as recited in claim 1 wherein said flashlight bulb is mounted on the front of said casing, said handle is mounted on top of said casing, said recharging circuitry includes a charger input and a light emitting diode for indicating when charge is taken place mounted on the back of said casing, and said first and second switches are mounted on top of said casing disposed on either side of a portion of said handle.

12. A flashlight assembly as recited in claim 1 wherein said first switch is a three-position switch having "on", "off", and "flashing" positions thereof, the switch being maintained in the position to which it is moved.

13. A flashlight assembly as recited in claim 1 wherein said accessory device includes an a.m. and/or f.m. radio.

14. A flashlight assembly as recited in claim 1 wherein said accessory device comprises a battery-operated cigarette lighter.

* * * * *